United States Patent
Loh

(10) Patent No.: US 9,405,703 B2
(45) Date of Patent: Aug. 2, 2016

(54) TRANSLATION LOOKASIDE BUFFER

(71) Applicant: Advanced Micro Devices, Inc., Sunnyvale, CA (US)

(72) Inventor: Gabriel H. Loh, Bellevue, WA (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 232 days.

(21) Appl. No.: 14/296,361

(22) Filed: Jun. 4, 2014

(65) Prior Publication Data

US 2015/0356024 A1    Dec. 10, 2015

(51) Int. Cl.
*G06F 12/10* (2016.01)

(52) U.S. Cl.
CPC ........ G06F 12/1054 (2013.01); G06F 12/1027 (2013.01); *G06F 2212/608* (2013.01); *G06F 2212/68* (2013.01)

(58) Field of Classification Search
None
See application file for complete search history.

(56) References Cited

U.S. PATENT DOCUMENTS

| | | | | |
|---|---|---|---|---|
| 5,784,707 A * | 7/1998 | Khalidi | ............... | G06F 12/1009 711/201 |
| 5,946,716 A * | 8/1999 | Karp | ................... | G06F 12/1027 711/144 |
| 6,526,497 B1 * | 2/2003 | LaBerge | ............. | G06F 12/1027 711/207 |
| 7,797,510 B1 * | 9/2010 | Case | ................... | G06F 12/0897 345/543 |
| 8,527,736 B1 * | 9/2013 | Bagwell | .............. | G06F 12/1027 711/206 |
| 8,543,792 B1 * | 9/2013 | Glasco | ................ | G06F 12/1009 711/207 |
| 2006/0230223 A1 * | 10/2006 | Kruger | ................ | G06F 12/1009 711/6 |
| 2010/0106936 A1 * | 4/2010 | Doi | ...................... | G06F 12/1027 711/205 |
| 2011/0138149 A1 * | 6/2011 | Karlsson | ............. | G06F 12/1027 711/207 |
| 2012/0089811 A1 * | 4/2012 | Sawai | ................. | G06F 12/1027 711/207 |
| 2013/0111132 A1 * | 5/2013 | Zheng | ................. | G06F 12/0802 711/119 |
| 2013/0238875 A1 * | 9/2013 | Ramaraju | ........... | G06F 12/1027 711/207 |
| 2015/0121009 A1 * | 4/2015 | Smith | ................. | G06F 12/1009 711/122 |

OTHER PUBLICATIONS

Pham, CoLT: Coalesced Large-reach TLBs, ISM, 2012.
Talluri, Surpassing the TLB Performance of Superpages with Less Operating System Support, ASPLOS, Oct. 1994.

* cited by examiner

*Primary Examiner* — Kaushikkumar Patel
(74) *Attorney, Agent, or Firm* — Park, Vaughan, Fleming & Dowler LLP

(57) ABSTRACT

The described embodiments include a translation lookaside buffer ("TLB") that is used for performing virtual address to physical address translations when making memory accesses in a memory in a computing device. In the described embodiments, the TLB includes a hierarchy of tables that are each used for performing virtual address to physical address translations based on the arrangement of pages of memory in corresponding regions of the memory. When performing a virtual address to physical address translation, the described embodiments perform a lookup in each of the tables in parallel for the virtual address to physical address translation and use a physical address that is returned from a lowest table in the hierarchy as the translation.

20 Claims, 6 Drawing Sheets

TRANSLATION LOOKASIDE BUFFER

BACKGROUND

1. Field

The described embodiments relate to computing devices. More specifically, the described embodiments relate to a translation lookaside buffer with a hierarchy of tables for performing virtual address to physical address translations in computing devices.

2. Related Art

Many computing devices use a virtual memory technique for handling data accesses by programs being executed in a computing device. In these computing devices, when data is accessed by a program, a block of memory of a given size (e.g., 4 kB) that includes the data, called a "page" of memory, is copied from mass storage (e.g., a disk drive or semiconductor memory) to an available physical location in a main memory in the computing device. In order to avoid programs being required to manage the physical locations of the pages, a memory management unit in the computing device manages the physical locations of the pages. Instead of using addresses based on the physical locations of pages (or "physical addresses") for accessing memory, the programs access memory using "virtual addresses" in "virtual address spaces," which are local address spaces that are specific to corresponding programs. From a program's perspective, virtual addresses indicate the actual physical addresses (i.e., physical locations) where data is stored within the pages in memory and hence memory accesses are made by programs using the virtual addresses accordingly. However, the virtual addresses may not directly map to the physical addresses of the physical locations where data is stored. Thus, as part of managing the physical locations of pages, the memory management unit translates the virtual addresses used by the programs into the physical addresses where the data is actually located. The translated physical addresses are then used to perform the memory accesses for the programs.

To perform the above-described translations, the memory management unit uses a page table in memory that includes a set of translations from virtual addresses to physical addresses for corresponding pages in the memory. However, using the page table to translate virtual addresses to physical addresses is slow for various reasons (e.g., the size of the page table, the operations used to perform lookups for the translation, etc.). The computing device also includes a translation lookaside buffer (or "TLB"), which is a cache of virtual address to physical address translations that were previously acquired from the page table. Performing the translation from virtual address to physical address using the TLB is significantly faster than performing the translation using the page table. However, TLBs are typically limited in size due to constraints on the area that the TLB is allowed to occupy in the integrated circuits in which the TLB is fabricated. This means that the use of the TLB can be limited and some virtual address to physical address translations must still be performed using the page table.

BRIEF DESCRIPTION OF THE FIGURES

Throughout the figures and the description, like reference numerals refer to the same figure elements.

DETAILED DESCRIPTION

Figure 1:
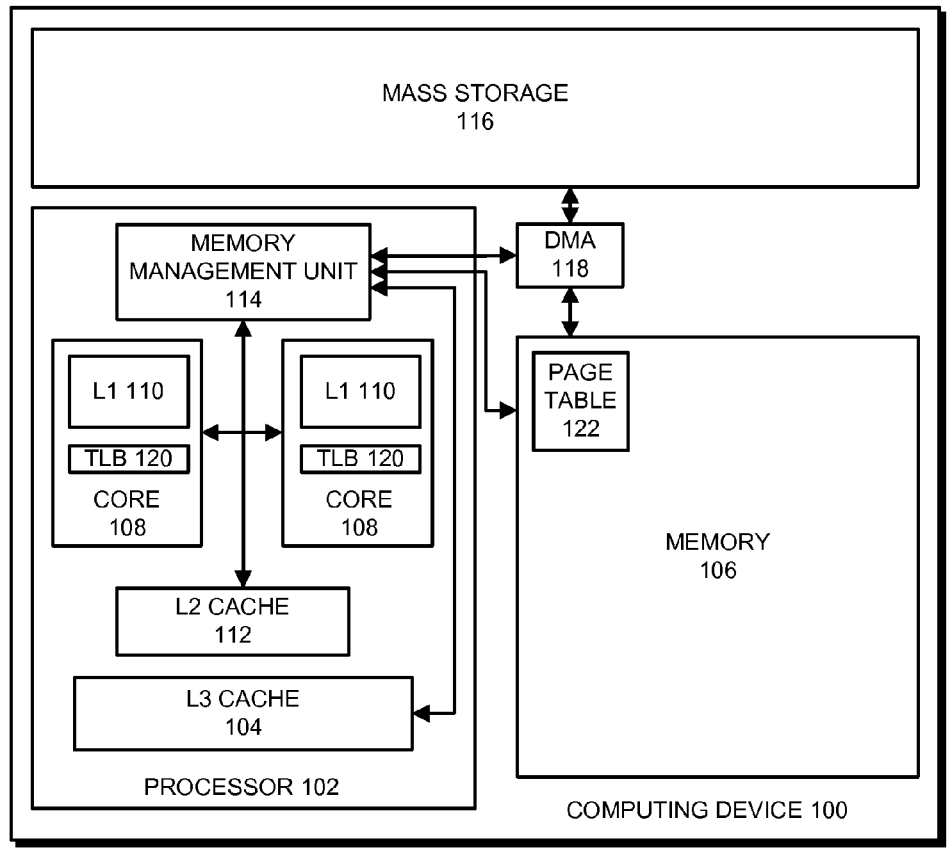
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Virtual Memory

The described embodiments use a virtual memory technique for handling data accesses by programs being executed in a computing device. In the described embodiments, when data is accessed by a program, a block of memory of a given size (e.g., 4 kB) that includes the data, called a "page" of memory, is copied from mass storage (e.g., a disk drive or semiconductor memory) to an available physical location in a main memory in the computing device. In order to avoid programs being required to manage the physical locations of pages, a memory management unit in the computing device manages the physical locations of the pages. In these embodiments, instead of using addresses based on the physical locations of pages (or "physical addresses") for accessing memory, the programs access memory using "virtual addresses" in "virtual address spaces" that are local address spaces that are specific to corresponding programs. From a program's perspective, virtual addresses indicate the actual physical locations where data is stored within the pages in memory and hence memory accesses are made by programs using the virtual addresses accordingly. However, the virtual addresses may not directly map to the physical addresses of the physical locations where data is stored. Thus, as part of managing the physical locations of pages, the memory management unit translates the virtual addresses used by the programs into the physical addresses where the data is actually located. The translated physical addresses are then used to perform the memory accesses for the programs.

Overview

The described embodiments include a translation lookaside buffer ("TLB") that is used for performing virtual address to physical address translations when performing memory accesses in a memory in a computing device. In the described embodiments, the TLB includes a hierarchy of tables that are used for performing virtual address to physical address translations for different levels of detail (or "granularities") in the memory. In these embodiments, each table in the hierarchy includes virtual address to physical address translations for regions of memory of a corresponding size. For example, in some embodiments, the hierarchy of tables in the TLB comprises (starting from a highest table and proceeding down through the hierarchy):

(1) a consecutive region lookup table,
(2) a consecutive page lookup table, and
(3) a specific page lookup table.

In these embodiments, the consecutive region lookup table includes translations that apply to larger regions of memory (e.g., 2 MB, 4 MB, etc.), the consecutive page lookup table includes translations that apply to smaller regions of memory (e.g., 64 kB, 128 kB, etc.), and the specific page lookup table includes translations that apply to individual pages (e.g., 4 kB pages, 8 kB pages, etc.). The translations in the "regional" tables (i.e., the consecutive region lookup table and the consecutive page lookup table) indicate whether or not corresponding contiguous virtual addresses map to contiguous pages in the regions (i.e., map to pages in the memory at corresponding offsets from a given base physical address). For example, assuming an embodiment where the consecutive region lookup table applies to regions that are 4 MB in size and that the base address is A, the translations in the consecutive region lookup table apply to consecutive 4 MB regions of memory starting from the base physical address A (A, A+4 MB, A+8 MB, etc.) and indicate whether corresponding contiguous virtual addresses translate to physical addresses for contiguous pages in the regions.

In some embodiments, the virtual address to physical address translations are more specific in tables lower in the hierarchy, with the lowest table holding the most specific translations. For example, in an embodiment that uses the tables described above, a translation for a given virtual address may be present in the consecutive page lookup table, indicating that the corresponding page of memory is located in a region of memory at a corresponding offset from a given base physical address A. However, if the page of memory is not located in the region at the corresponding offset from the given base physical address A, but instead is located elsewhere in the memory, a translation that indicates a physical address where the page of memory is actually located will be present in the specific page lookup table. In these embodiments, a physical address acquired from a lowest table in the hierarchy of tables is used as the translation for the given virtual address.

By using the hierarchy of tables in the TLB, the described embodiments are able to include more virtual address to physical address translation information in the TLB (in comparison to existing TLBs) without significantly increasing the amount of circuitry used for storing the translation information and/or for performing TLB lookups. This can improve the performance of the TLB by enabling lookups to return results from (or "hit" in) the TLB more often, which can improve the speed of memory accesses in the computing device by avoiding significantly slower page table walks. This, in turn, can improve the overall performance, reduce the energy consumption, and/or provide other benefits for the computing device.

Computing Device

FIG. 1 presents a block diagram illustrating a computing device 100 in accordance with some embodiments. As can be seen in FIG. 1, computing device 100 includes processor 102, memory 106, mass storage 116, and direct memory access mechanism 118 ("DMA 118"). Processor 102 is a device that performs computational operations in computing device 100. Processor 102 includes two processor cores 108, each of which includes a computational mechanism such as a central processing unit (CPU), a graphics processing unit (GPU), an embedded processor, an application specific integrated circuit (ASIC), and/or another computational mechanism.

Processor 102 also includes cache memories (or "caches") that are used for storing instructions and data that are used by the processor cores 108 for performing computational operations. As can be seen in FIG. 1, the caches in processor 102 include a level-one (L1) cache 110 ("L1 110") in each processor core 108 that comprises memory circuits such as one or more of static random access memory (SRAM), embedded dynamic random access memory (eDRAM), dynamic random access memory (DRAM), double data rate synchronous DRAM (DDR SDRAM), and/or other types of memory circuits for storing instructions and data for use by the corresponding processor core 108, as well as control circuits for handling accesses of the instructions and data that are stored/cached in the memory circuits. In some embodiments, the L1 caches 110 are the smallest of a set of caches in processor 102 (in terms of the capacity of the memory circuits) and are located closest to the functional blocks (e.g., execution units, instruction fetch units, etc.) that use the instructions and data in the corresponding processor core 108.

Processor 102 additionally includes a shared level-two (L2) cache 112 that comprises memory circuits such as one or more of SRAM, eDRAM, DRAM, DDR SDRAM, and/or other types of memory circuits for storing instructions and data for use by both the processor cores 108, as well as control circuits for handling accesses of the instructions and data that are stored/cached in the memory circuits. In some embodiments, L2 cache 112 is larger than the L1 caches 110 and is located on the same semiconductor die as the processor cores 108.

Processor 102 further includes a shared level-three (L3) cache 104 that comprises memory circuits such as one or more of SRAM, eDRAM, DRAM, DDR SDRAM, and/or other types of memory circuits for storing instructions and data for use by both the processor cores 108, as well as control circuits for handling accesses of the instructions and data that are stored/cached in the memory circuits. In some embodiments, L3 cache 104 is the largest of the caches in processor 102 and is located on the same semiconductor die as the processor cores 108.

Memory 106 is the "main memory" of computing device 100, and comprises memory circuits such as one or more of DRAM, DDR SDRAM, and/or other types of memory circuits, as well as control circuits for handling accesses of the instructions and data that are stored in the memory circuits. In some embodiments, memory 106 includes significantly more memory circuits (in terms of the capacity of the memory circuits) than the caches in computing device 100, and is located on one or more memory dies that are communicatively coupled to processor 102 via a bus.

Taken together, the L1 caches 110, L2 cache 112, L3 cache 104, and memory 106 form a "memory hierarchy" in and for computing device 100. Each of the caches and memory 106 are regarded as levels of the memory hierarchy, with the lower levels including the larger caches and memory 106.

Mass storage 116 is a mass-storage device such as a high-capacity semiconductor memory (a non-volatile semiconductor memory such as a flash memory, a random access memory (RAM), etc.), a disk drive (hard drive, etc.), an optical drive, etc. that stores instructions and data for use in computing device 100. In some embodiments, mass storage 116 holds data that is retrieved by memory management unit 114 to be stored in memory 106 to make the data ready for use by functional blocks in computing device 100. For example, data may be retrieved from mass storage 116 in blocks of a given size (e.g., 4 kB, 8 kB, etc.), which are called "pages," and the pages can be stored in memory 106 in preparation for accesses by processor cores 108 in processor 102.

Memory management unit 114 is a functional block that handles memory access requests in processor 102. When data (which may comprise one or more of data, instructions, etc.) is to be accessed by a functional block in processor 102 (i.e., read, written, checked/verified, deleted, invalidated, etc. by a processor core 108 or another functional block), the functional block sends a memory access request to memory management unit 114. Memory management unit 114 then sends a corresponding request to one or more of L2 cache 112, L3 cache 104, and memory 106 for satisfaction/resolution of the memory access request. For example, if data is to be retrieved based on the memory access request, memory management unit 114 may acquire the data from L2 cache 112, L3 cache 104, or memory 106 (or mass storage 116, should the data not be present in one of L2 cache 112, L3 cache 104, or memory 106) and forward the data to the requesting functional block.

As described above, in some embodiments, computing device 100 uses virtual memory to enable programs (e.g., executed by processor cores 108) to access memory without managing the physical locations of pages in memory 106. In these embodiments, memory management unit 114 performs operations for translating virtual addresses in memory access requests from the programs into the physical addresses for the pages where data is located in memory 106. In some embodiments, memory management unit 114 uses two mechanisms to enable the virtual address to physical address translations. The first of the mechanisms is page table 122, which is a data structure (e.g., a table, an array, a list, etc.) that is stored in memory 106. Page table 122 includes a number of entries, each of which is configured to store a virtual address to physical address translation, along with corresponding metadata for the entry. Generally, a virtual address to physical address translation indicates a physical location (e.g., starting address in memory 106) of page of memory where data for one or more virtual addresses is located. In some embodiments, page table 122 holds at least one translation for each available/valid page present in memory 106. Thus, in these embodiments, if a page has been copied from mass storage 116 to memory 106 and remains available in memory 106, a corresponding virtual address to physical address translation exists in page table 122.

The second of the mechanisms for performing virtual address to physical address translations in memory management unit 114 is translation lookaside buffer 120 ("TLB 120"), which is a cache in (and for) each core 108 that is configured to store information based on previously acquired virtual address to physical address translations (which were acquired by performing a page table walk in page table 122). Each TLB 120 includes special-purpose lookup circuits that are configured to use the information based on previously acquired virtual address to physical address translations to perform virtual address to physical address translations faster than the same translations could be performed using page table 122. However, because the TLBs 120 are caches (with dedicated lookup circuits, etc.), the TLBs 120 are relatively expensive in terms of circuit area, power, etc. when compared to page table 122 (which is, as described above, a data structure in memory 106). Thus, the TLBs 120 may have significantly less capacity than page table 122—so less virtual address to physical address translations may be stored therein (i.e., in contrast to page table 122, the TLBs 120 may store only a subset of the virtual address to physical address translations for all available pages in memory 106).

Direct memory access mechanism 118 ("DMA 118") in computing device 100 is a functional block that is configured to perform transfers of data from mass storage 116 to memory 106 and vice versa. Generally, DMA 118 offloads data transfer operations from processor 102, which enables processor 102 to avoid performing some of the computational work involved with performing memory transfers. This in turn enables processor 102 to perform other computational operations instead of and/or in parallel with memory transfers that are performed by DMA 118. In some embodiments, the operation of copying a page of data from mass storage 116 to memory 106 as described herein is performed by DMA 118 based on a request received from memory management unit 114.

In some embodiments, communication paths (that include one or more busses, wires, and/or connections) are coupled between the various elements in computing device 100 (processor core 108, memory management unit 114, memory 106, etc.), as shown by arrow-headed lines between the elements. The communication paths are used to transmit commands such as memory requests, data such as return data for memory requests, and/or other information between the elements.

Although embodiments are described with a particular arrangement of processor cores 108, some embodiments include a different number and/or arrangement of processor cores 108. For example, some embodiments have only one processor core 108 (in which case the caches are used by the single processor core 108), while other embodiments have two, five, eight, or another number of processor cores 108—with the caches adjusted accordingly. Generally, the described embodiments can use any arrangement of processor cores 108 that can perform the operations herein described.

Additionally, although embodiments are described with a particular arrangement of caches, some embodiments include a different number and/or arrangement of caches. For example, the caches (e.g., L1 cache 110, etc.) may be divided into separate instruction and data caches. Additionally, L2 cache 112 may not be shared, and hence may only be used by a single processor core (and hence there may be two L2 caches 112 in processor 102). As another example, some embodiments include different levels of caches, from only one level of cache to multiple levels of caches, and these caches may be located in processor 102 and/or external to processor 102. Generally, the described embodiments can use any arrangement of caches that can perform the operations herein described.

Also, although embodiments are described for which computing device has one memory management unit 114, some embodiments have a different number and/or arrangement of memory management units. For example, in some embodiments, each core 108 has a memory management unit 118 in the core 108. Generally, the described embodiments include sufficient memory management units to perform the operations herein described.

Moreover, although computing device 100 and processor 102 are simplified for illustrative purposes, in some embodiments, computing device 100 and/or processor 102 include additional mechanisms for performing the operations herein described and other operations. For example, computing device 100 and/or processor 102 may include power controllers, batteries, media processors, input-output mechanisms, communication mechanisms, networking mechanisms, display mechanisms, etc.

Computing device 100 can be or can be included in any electronic device that performs computational operations. For example, computing device 100 can be or can be included in electronic devices such as desktop computers, laptop computers, wearable computing devices, tablet computers, smart phones, servers, network appliances, toys, audio-visual equipment, home appliances, controllers, etc., and/or combinations thereof.

Translation Lookaside Buffer

Figure 2:
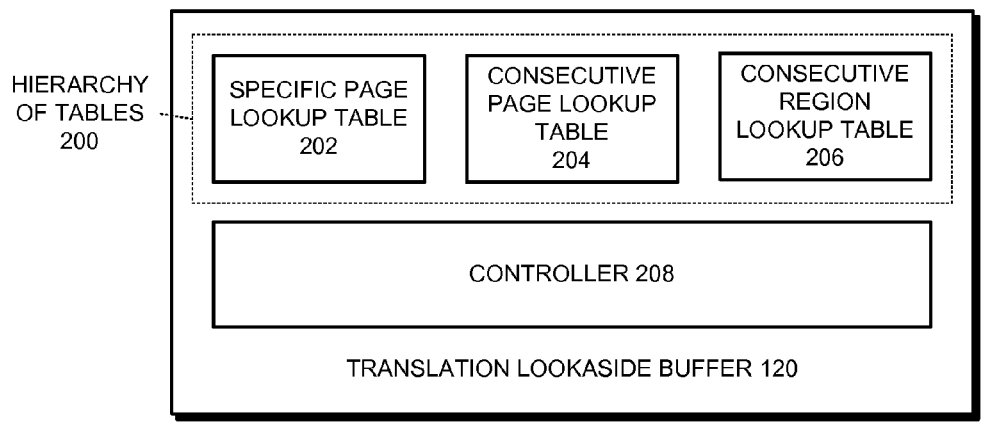
FIG. 2 presents a block diagram illustrating a translation lookaside buffer in accordance with some embodiments.

As described above, each TLB 120 is a cache that is used for performing virtual address to physical address translations for memory accesses in computing device 100 for the corresponding core 108. In some embodiments, each TLB 120 includes a hierarchy of tables that are used for performing the virtual address to physical address translations for different levels of detail (or "granularities") in memory 106. FIG. 2 presents a block diagram illustrating a TLB 120 in accordance with some embodiments. As can be seen in FIG. 2, TLB 120 includes a hierarchy of tables 200 with specific page lookup table 202, consecutive page lookup table 204, and consecutive region lookup table 206. TLB 120 also includes controller 208. Note that, in this description, TLB 120 may be referred to as a single entity, however, the corresponding description applies to each TLB 120 present in computing device 100 (two TLBs 120 are shown in FIG. 1).

In some embodiments, specific page lookup table 202, consecutive page lookup table 204, and consecutive region lookup table 206 (collectively called "the lookup tables") are stored in memory circuits and/or other circuit elements in TLB 120 (which, as described above, can be either TLB 120 in cores 108). For example, in some embodiments, one or more of the lookup tables is implemented as a content-addressable memory (CAM). As another example, in some embodiments, one or more of the lookup tables are stored in one or more types of random access memory.

In some embodiments, each table in hierarchy of tables 200 includes virtual address to physical address translations for regions of memory of a corresponding size. For example, in some embodiments, consecutive region lookup table 206 includes translations that apply to larger regions of memory (e.g., 2 MB, 4 MB, etc.), consecutive page lookup table 204 includes translations that apply to smaller regions of memory (e.g., 128 kB, 64 kB, etc.), and the specific page lookup table 202 includes translations that apply to individual pages (e.g., 4 kB pages, 8 kB pages, etc.). In these embodiments, the translations in the "regional" tables (i.e., consecutive region lookup table 206 and consecutive page lookup table 204) indicate whether or not corresponding contiguous virtual addresses map to contiguous pages in a region of memory 106. For example, assuming an embodiment where consecutive region lookup table 206 applies to 4 MB regions, each translation in consecutive region lookup table 206 applies to a 4 MB region and a set of sub-regional flags/indicators in each translation indicate whether pages in a sub-region of the 4 MB region (e.g., a 128 kB sub-region within the 4 MB region) are contiguous—in that contiguous virtual addresses map to pages at corresponding offsets from a base physical address A that is associated with the table. The tables in TLB 120 are described in more detail below.

Controller 208 in TLB 120 includes lookup circuits and control circuits for handling the operation of TLB 120. For example, in some embodiments, the lookup circuits include general-purpose processing circuits, purpose-specific lookup circuits, pipelines, etc. that are configured to perform computations related to lookups for available physical address translations in one or more of the tables in the hierarchy of tables 200 based on a given virtual address. In these embodiments, the lookup circuits may compute tag values and other values based on received virtual addresses for performing lookups in the table, determine which physical addresses to use, etc. As another example, in some embodiments, the control circuits in controller 208 are configured to update one or more tables in the hierarchy of tables 200 based on a virtual address to physical address translation acquired during a page table walk in page table 122.

Although embodiments are described in which TLB 120 includes a hierarchy of tables 200 with three tables, in some embodiments, a different number of tables are used. For example, four tables may be used, with the fourth table including virtual address to physical address translations for regions of an intermediate size (e.g., 1 MB, 16 kB, etc.) or regions of a larger size (than consecutive region lookup table 206) (e.g., 12 MB, 64 MB, etc.). As another example, two tables may be used, so that one of consecutive page lookup table 204 and consecutive region lookup table 206 is not present in TLB 120. Generally, any number of tables may be used that enable the operations herein described.

Specific Pane Lookup Table

Figure 3:
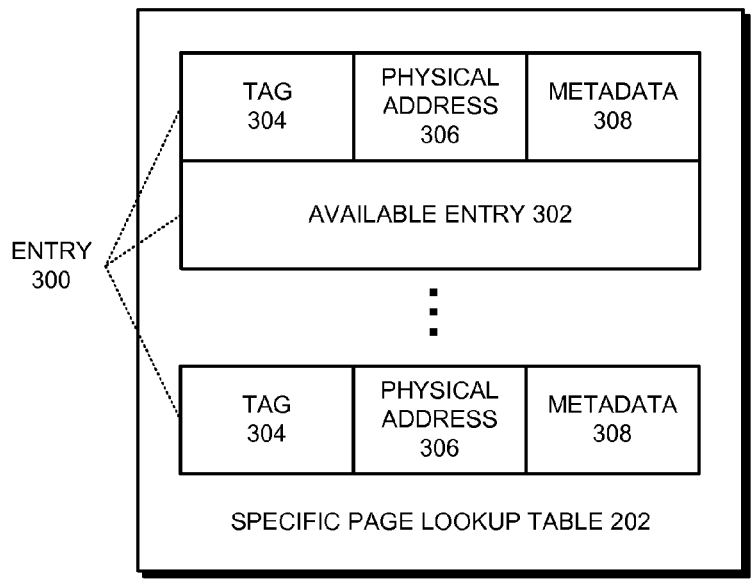
FIG. 3 presents a block diagram illustrating a specific page lookup table in accordance with some embodiments.

FIG. 3 presents a block diagram illustrating specific page lookup table 202 in accordance with some embodiments. As described above, specific page lookup table 202 includes virtual address to physical address translations for individual pages in memory 106. Thus, each translation in specific page lookup table 202 includes information for translating one or more virtual addresses into a physical address for a corresponding page in memory 106 (e.g., a starting address for the page, etc.). Specific page lookup table 202 therefore enables memory management unit 114 to acquire physical addresses for particular pages in memory 106 based on virtual addresses.

As can be seen in FIG. 3, specific page lookup table 202 includes a number of entries 300. The entries 300 are either active, and thus hold a virtual address to physical address translation (interchangeably called "specific page records" herein), or are inactive, such as available entry 302, and do not hold a virtual address to physical address translation. The specific page record in each active entry 300 includes tag 304 and physical address 306. Tag 304 includes information based on at least one virtual address that translates into a physical address in physical address 306. For example, in some embodiments, tag 304 includes address information (e.g., address bits) from a particular/single virtual address that translates into the physical address in physical address 306. As another example, in some embodiments, tag 304 includes a portion of the address bits for two or more virtual addresses (e.g., an upper 48 bits of 64 bit virtual addresses) that translate into the physical address in physical address 306. In these embodiments, virtual addresses for which the portion of the address bits matches the portion of the address bits in tag 304 translate into the physical address in physical address 306. For example, two or more virtual addresses may translate into physical addresses for different locations in the same page (such as virtual addresses for two or more 64-byte, 128-byte, etc. chunks of data at different locations in a 4 kB page), and thus specific page lookup table 202 may include a single entry used to provide a translation (e.g., a starting physical address for a corresponding page) for multiple virtual addresses such as these based on some portion (upper, lower, middle, etc.) of the bits of the virtual addresses. As yet another example, in some embodiments, tag 304 includes a hash value that can be generated by computing the output of a function based on one or more different virtual addresses (such as for when two or more virtual addresses may translate into physical addresses for different locations in the same page, as described above). In these embodiments, multiple virtual addresses may be used to generate the same hash value. Thus, in some embodiments, multiple virtual addresses may translate to a single physical address in physical address 306 (i.e., all of the virtual addresses that translate to a given page of memory may generate the same tag 304, so that TLB 120 returns a physical address 306 indicating the start of the page). In some embodiments, the physical address in physical address 306 is an address indicating a page in memory 106 such as a starting address for the page in memory 106.

Each entry in specific page lookup table 202 also includes metadata 308. Metadata 308 in each entry 300 includes information about the entry 300, information about a corresponding page, and/or information about the translation in the entry 300. For example, in some embodiments, the information about the entry 300 includes one or more of validity info, timeout values, usage counts, usage timers, error correcting codes, etc. As another example, in some embodiments, the information about the translation includes one or more of version information, computation information, hash indicators, source information, bitmasks, etc. As yet another example, in some embodiments, the information about the corresponding page includes information associated with the corresponding page in memory 106, such as permissions (read/write, execute, etc.), replacement information, valid bits, etc.

Although three entries are shown in specific page lookup table 202 in FIG. 3, in some embodiments, specific page lookup table 202 includes a different number of entries (indicated by the ellipsis in FIG. 3). Generally, specific page lookup table 202 includes sufficient entries 300 to enable the operations herein described.

Note that, in some existing devices, TLBs include lookup structures that function similarly to specific page lookup table 202. In these devices, the lookup structure in the TLBs may have entries with information similar to the information in entries 300 in specific page lookup table 202 (i.e., for translating virtual addresses into physical addresses). However, unlike the described embodiments, existing devices do not have a hierarchy of tables that are used to perform virtual address to physical address translations (with tables such as consecutive page lookup table 204, consecutive region lookup table 206, etc.).

Consecutive Pane Lookup Table

Figure 4:
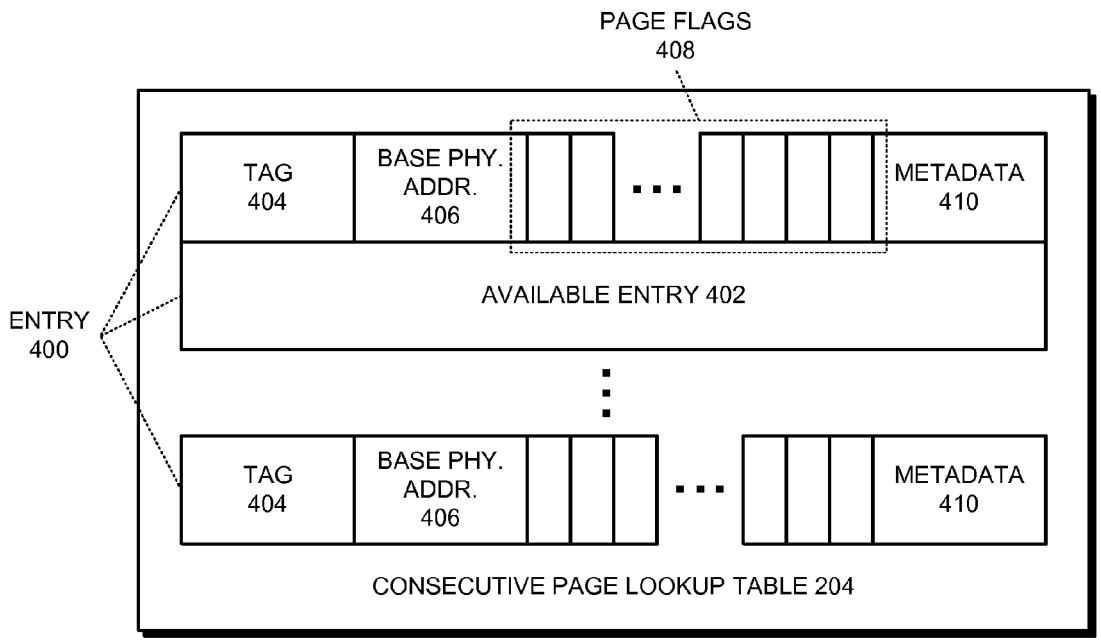
FIG. 4 presents a block diagram illustrating a consecutive page lookup table in accordance with some embodiments.

FIG. 4 presents a block diagram illustrating consecutive page lookup table 204 in accordance with some embodiments. As described above, consecutive page lookup table 204 includes virtual address to physical address translations for pages within regions of memory 106. Thus, each translation in consecutive page lookup table 204 includes information for translating virtual addresses into physical addresses for corresponding pages in memory 106 at given offsets from a base physical address. Consecutive page lookup table 204 therefore enables memory management unit 114 to acquire physical addresses for particular pages in memory 106 based on virtual addresses and corresponding offsets from the base physical address.

As can be seen in FIG. 4, consecutive page lookup table 204 includes a number of entries 400. The entries 400 are either active, and thus hold virtual address to physical address translations (which are interchangeably called "consecutive page records" herein), or are inactive, such as available entry 402, and do not hold a virtual address to physical address translation. The consecutive page record in each active entry 400 includes tag 404, base physical address 406 ("BASE PHY. ADDR. 406"), and page flags 408. Tag 404 generally includes information based on virtual addresses for which the corresponding entry 400 includes translation information. For example, in some embodiments, tag 404 includes a portion of the address bits for two or more virtual addresses (e.g., an upper 48 bits of 64 bit virtual addresses) for which the corresponding entry 400 holds translation information. As another example, in some embodiments, tag 404 includes a hash value that can be computed from virtual addresses for which the corresponding entry 400 holds translation information.

Base physical address 406 includes address information that is used to determine physical addresses for the one or more pages represented by page flags 408. In some embodiments, base physical address 406 is used (along with corresponding offsets) to compute starting addresses for the pages or other addresses that can be used to identify the pages.

Page flags 408 are indicators (e.g., one or more bits) that indicate if a corresponding page is located at a corresponding offset from base physical address 406. For example, assuming that pages in computing device are 4 kB in size, a first page flag indicates whether (when set to a predetermined value such as 1) or not (when set to a predetermined value such as 0) a first virtual address translates to the base physical address 406 for the entry 400 (i.e., translates to a physical address for a page in memory at the base physical address 406 without an offset). Continuing the example, a second page flag indicates whether or not a second virtual address, which is a virtual address contiguous with the first virtual address (i.e., offset from the first virtual address by 4 kB), translates to the base physical address 406 for the entry 400 plus a 4 kB offset (i.e., translates to a physical address for a page in memory at the base physical address 406 with a single-page offset). This pattern continues for each page flag 408 in an entry 400. When a page flag 408 is unset (set to zero), in some embodiments, it indicates that there is no translation for the page in the consecutive page lookup table 204, that the translation is invalid (expired, corrupted, etc.), and/or that there is no translation for another reason.

Each entry in consecutive page lookup table 204 also includes metadata 410. Metadata 410 in each entry 400 includes information about the entry 400, information about one or more pages in memory 106, and/or, information about the translations from entry 400. For example, in some embodiments, the information about the entry 400 includes one or more of validity info, timeout values, usage counts, usage timers, error correcting codes, etc. As another example, in some embodiments, the information about the translation includes one or more of version information, computation information, hash indicators, source information, bitmasks, etc. As yet another example, in some embodiments, the information about the one or more pages in memory includes one or more of page permissions (read/write, execute, etc.), page replacement information, page validity information, etc. Because metadata 410 potentially applies to multiple pages (one for each page flag 408), metadata 410 may be arranged to indicate the one or more pages to which metadata 410 applies, e.g., via bitmasks in which each position represents a page and/or other indicator. In addition, metadata 410 may have different information for different pages.

Note that consecutive page lookup table 204 differs from specific page lookup table 202 in that the use of page flags 408 and base physical address 406 enables virtual address to physical address translations to be made for multiple contiguous virtual addresses/pages using the information in entry 400 without storing physical address 306 (and possibly separate metadata 308) for each virtual address to physical address translation.

Although three entries are shown in consecutive page lookup table 204 in FIG. 4, in some embodiments, consecutive page lookup table 204 includes a different number of entries 400 (indicated by the ellipsis in FIG. 4). Generally, consecutive page lookup table 204 includes sufficient entries 500 to enable the operations herein described.

Consecutive Region Lookup Table

Figure 5:
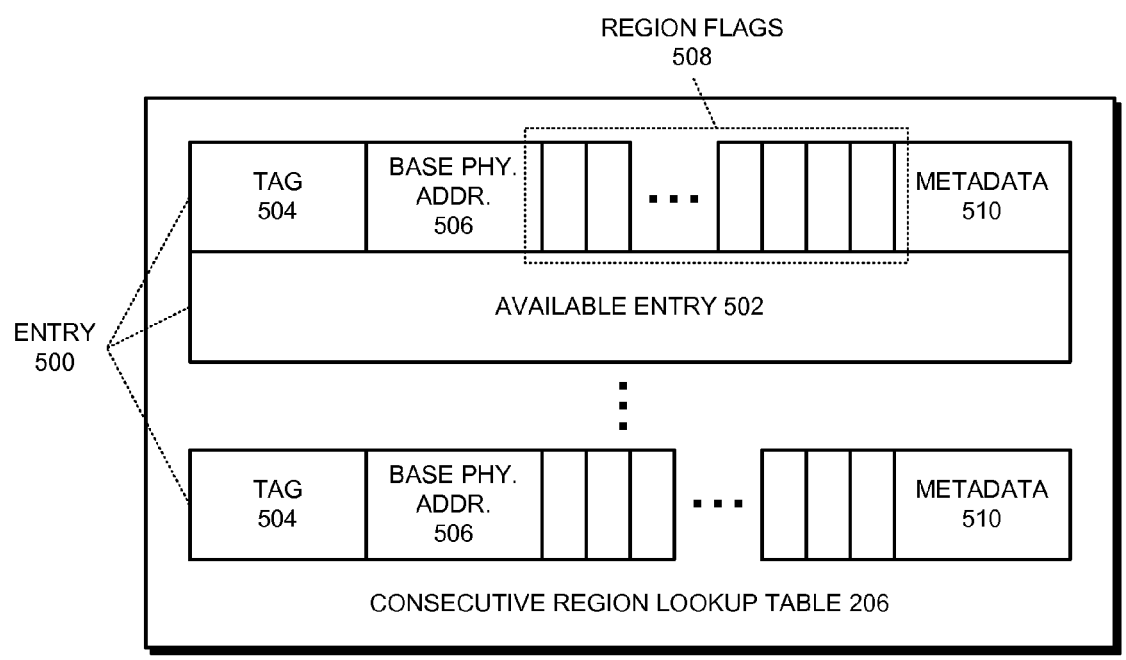
FIG. 5 presents a block diagram illustrating a consecutive region lookup table in accordance with some embodiments.

FIG. 5 presents a block diagram illustrating consecutive region lookup table 206 in accordance with some embodiments. As described above, consecutive region lookup table 206 includes virtual address to physical address translations for pages within regions of memory 106. Thus, each translation in consecutive region lookup table 206 includes information for translating virtual addresses into physical addresses for corresponding pages in memory 106 at given offsets from a base physical address. Consecutive region lookup table 206 therefore enables memory management unit 114 to acquire physical addresses for particular pages in memory 106 based on virtual addresses and corresponding offsets from the base physical address.

As can be seen in FIG. 5, consecutive region lookup table 206 includes a number of entries 500. The entries 500 are either active, and thus hold virtual address to physical address translations (which are interchangeably called "consecutive region records" herein), or are inactive, such as available entry 502, and do not hold a virtual address to physical address translation. The consecutive region records in each active entry 500 include tag 504, base physical address 506 ("BASE PHY. ADDR. 506"), and region flags 508. Tag 504 generally includes information based on virtual addresses for which the corresponding entry 500 includes translation information. For example, in some embodiments, tag 504 includes a portion of the address bits for two or more virtual addresses (e.g., an upper 48 bits of 64 bit virtual addresses) for which the corresponding entry 500 holds translation information. As another example, in some embodiments, tag 504 includes a hash value that can be computed from virtual addresses for which the corresponding entry 500 holds translation information.

Base physical address 506 includes address information that is used to determine physical addresses for the one or more pages represented by region flags 508. In some embodiments, base physical address 506 is used (along with corresponding offsets) to compute starting addresses for the pages or other addresses that can be used to identify the pages.

Region flags 508 are indicators (e.g., one or more bits) that indicate whether or not pages in a corresponding region of memory 106 are contiguous, where the pages are "contiguous" when contiguous virtual addresses translate into contiguous physical addresses for the pages. For example, assuming that pages in computing device are 4 kB in size, pages in the region are contiguous when a first virtual address translates to a physical address for a first page in the region, a second virtual address contiguous with the first virtual address (i.e., offset from the first virtual address by 4 kB) translates to a physical address for a next page in the region, and so forth. When the pages in a region are contiguous, the corresponding region flag is set (to a predetermined value such as 1), otherwise, when the pages in the region are not contiguous (or when there is no translation available for the region), the corresponding region flag is unset (set to a predetermined value such as 0). Thus, if a first page flag is set and a second page flag is unset, the pages in a first (e.g., 128 kB) region are contiguous, while the pages in a next (neighboring) region are not contiguous and/or there is no translation for the region. This pattern continues for each region flag 508 in an entry 500. When a region flag 508 is set to zero, in some embodiments, it indicates that there is no translation for the page in the consecutive region lookup table 206, that the translation is invalid (expired, corrupted, etc.), and/or that there is no translation for another reason.

Each entry in consecutive region lookup table 206 also includes metadata 510. Metadata 510 in each entry 500 includes information about the entry 500, information about one or more regions (or pages) in memory 106, and/or, information about the translations from entry 500. For example, in some embodiments, the information about the entry 500 includes one or more of validity info, timeout values, usage counts, usage timers, error correcting codes, etc. As another example, in some embodiments, the information about the translation includes one or more of version information, computation information, hash indicators, source information, bitmasks, etc. As yet another example, in some embodiments, the information about the one or more regions (or pages) in memory includes one or more of region and/or page permissions (read/write, execute, etc.), region and/or page replacement information, region and/or page validity information, etc. Because metadata 510 potentially applies to multiple regions and/or pages (i.e., multiple regions for each entry 500 and multiple pages for each region), metadata 510 may be arranged to indicate the one or more regions and/or pages to which metadata 510 applies, e.g., via bitmasks in which each position represents a region and/or page and/or other indicator. In addition, metadata 510 may have different information for different regions and/or pages.

Note that consecutive region lookup table 206 differs from consecutive page lookup table 204 in the use of region flags 508 to represent regions that each include multiple pages. This use of region flags 508 enables virtual address to physical address translations to be made for multiple contiguous virtual addresses/pages in the regions using the information in an entry 500 with less information than is used in consecutive page lookup table 204. The difference between specific page lookup table 202 and consecutive region lookup table 206 in the amount of information stored per translation is, in turn, more considerable (see the description of the difference between specific page lookup table 202 and consecutive page lookup table 204 above for clarification).

Although three entries are shown in consecutive region lookup table 206 in FIG. 5, in some embodiments, consecutive region lookup table 206 includes a different number of entries 500 (indicated by the ellipsis in FIG. 5). Generally, consecutive region lookup table 206 includes sufficient entries 500 to enable the operations herein described.

Figure 6:
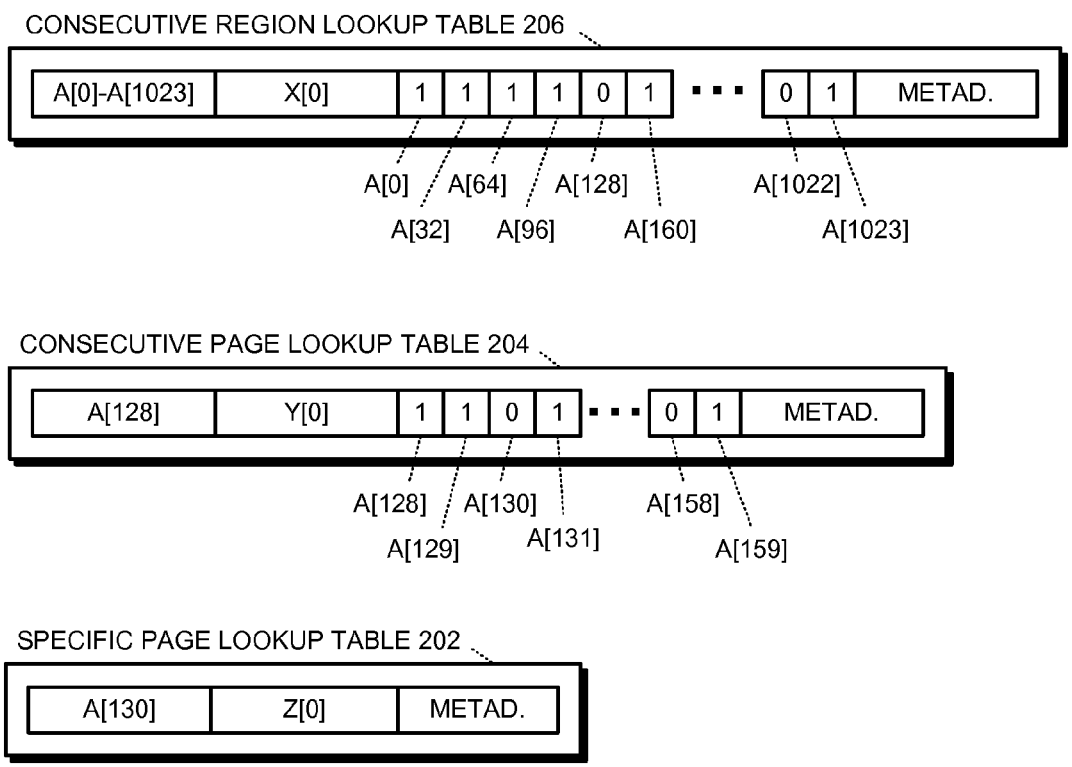
FIG. 6 presents a block diagram illustrating tables in a hierarchy of tables in a translation lookaside buffer in accordance with some embodiments.

Performing Virtual Address to Physical Address Translations Using the Hierarchy of Tables FIG. 6 presents a block diagram illustrating tables in a hierarchy of tables 200 in TLB 120 in accordance with some embodiments. For the embodiment shown in FIG. 6, specific page lookup table 202, consecutive page lookup table 204, and consecutive region lookup table 206 are used as the tables. For clarity, each table is shown with a single entry (e.g., consecutive region lookup table 206 includes an entry for addresses A[0]-A[1023], but no other entries are shown). However, some embodiments include different tables and/or more than one entry per table. In addition, addresses in the format A[0], Z[0], etc. are used in FIG. 6. However, in some embodiments, the addresses are values that can be used by programs executed by a functional block in processor 102 (i.e., virtual addresses) and/or used for addressing physical locations in memory 106 (i.e., physical addresses). Moreover, although certain operations are described with regard to FIG. 6, in some embodiments, different operations are performed and/or operations are performed in a different order.

As shown in FIG. 6, specific page lookup table 202 has an entry with a tag 304 representing virtual address A[130], the entry indicating that A[130] translates to a physical address 306 of Z[0]. Consecutive page lookup table 204 has an entry with a tag 404 representing virtual address A[128] that includes 32 page flags 408 for the 32 4 kB pages within the 128 kB region starting at virtual address A[128] (some of the page flags 408 are not shown in FIG. 6). The page flags 408 for virtual addresses A[128] and A[129] in consecutive page lookup table 204 are set to one, which indicates that the corresponding pages are located at, respectively, the base physical address Y[0] and a physical address that is 4 kB (i.e., one page) offset from base physical address Y[0] (i.e., Y[1]). However, because the page flag 408 for A[130] in consecutive page lookup table 204 is set to zero, consecutive page lookup table 204 indicates that the corresponding page is not located at a physical address that is 8 kB offset from base physical address Y[0] (i.e., Y[2]) (i.e., is not contiguously located with respect to a page for virtual address A[129]). Consecutive region lookup table 206 has an entry with a tag 504 representing virtual addresses A[0]-A[1023] that includes 32 region flags 508 for the 32 128 kB regions within a 4 MB region starting at virtual address A[0] (some of the region flags 508 are not shown in FIG. 6). The region flags 508 for virtual addresses A[0] and A[32] are set to one, which indicates that the pages in regions that are located at, respectively, the base physical address X[0] and a physical address that is 128 kB offset from base physical address X[0] (i.e., X[1], which is address X[0]+128 kB) are contiguous (in that contiguous virtual addresses translate to the respective pages). However, because the region flag 508 for A[128] is set to zero, consecutive region lookup table 206 indicates that the pages in a 128 kB region that is located at a physical address that is 512 kB offset from base physical address X[0] (i.e., X[4], which is address X[0]+512 kB) are not contiguous.

Upon receiving a memory access request that indicates virtual address A[130] (e.g., a memory read) from a functional block in processor 102 (e.g., a processor core 108), memory management unit 114 sends a request to TLB 120 for a virtual address to physical address translation for A[130]. Based on the request, controller 208 in TLB 120 performs a lookup for a virtual address to physical address translation in each of specific page lookup table 202, consecutive page lookup table 204, and consecutive region lookup table 206 in parallel (i.e., begins the lookups at substantially the same time). For example, in some embodiments, controller 208 can compute or generate a tag for each of the tables that is used to look up the particular entry in each table (if such an entry is present in the table) that holds the virtual address to physical address translation. The tag may be some or all of the bits from the address A[130], a value computed from the address A[130] alone or with one or more other values (e.g., a hash value, a result of a function, etc., possibly computed using one or more bitmasks, offsets, configuration values, identifiers for the source of the request, operating mode values, etc.), and/or another tag value. The controller 208 can then use a corresponding tag to perform the lookup in each table.

When performing the lookup in consecutive page lookup table 204, in some embodiments, the tag is used to determine the appropriate entry 400 (should such an entry be present in consecutive page lookup table 204) and then another operation is performed to determine which page flag is to be used for the translation. For example, a page flag can be determined using some or all of the bits in the virtual address (as an offset indicating the appropriate page flag, etc.), a value computed from the virtual address and zero or more other values, etc. The same sequence is performed for the consecutive region lookup table 206, with the tag used to determine the appropriate entry 500, and another value used to determine the region flag 508 to be used for the translation.

The lookups return nothing for the physical address from consecutive page lookup table 204 and consecutive region lookup table 206 because the corresponding page flag 408 and region flag 508 are set to zero. However, because specific page lookup table 202 includes an entry 300 with a virtual address to physical address translation for address A[130], the lookup in specific page lookup table 202 returns the address value Z[0], which can then be used by memory management unit 114 to perform the memory access for the requesting program.

Figure 7:
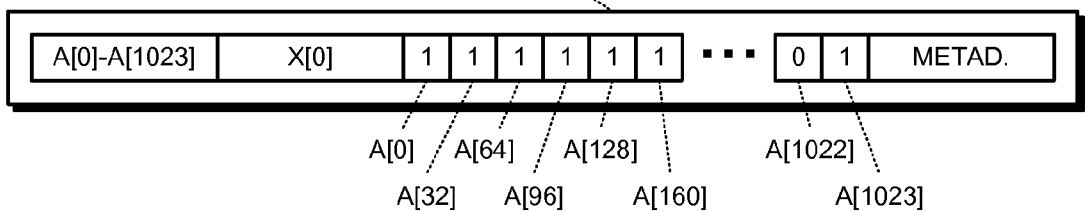
FIG. 7 presents a block diagram illustrating tables in a hierarchy of tables in a translation lookaside buffer in accordance with some embodiments.
Figure 7:
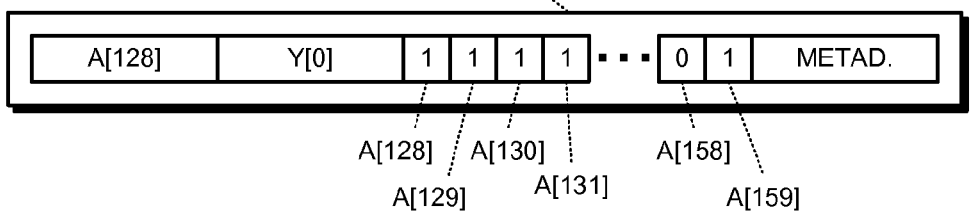
Figure 7:

FIG. 7 presents a block diagram illustrating tables in a hierarchy of tables 200 in TLB 120 in accordance with some embodiments. For the embodiment shown in FIG. 7, specific page lookup table 202, consecutive page lookup table 204, and consecutive region lookup table 206 are used as the tables. For clarity, the regional tables are each shown with a single entry (e.g., consecutive region lookup table 206 includes an entry for A[0]-A[1023] and no other entries are shown). However, some embodiments include different tables and/or more than one entry per table. In addition, addresses in the format A [0], Z[0], etc. are used in FIG. 7. However, in some embodiments, the addresses are values that can be used by programs executed by a functional block in processor 102 (i.e., virtual addresses) and/or used for addressing physical locations in memory 106 (i.e., physical addresses). Moreover, although certain operations are described with regard to FIG. 7, in some embodiments, different operations are performed and/or operations are performed in a different order.

As shown in FIG. 7 (illustrated in FIG. 7 by a lack of an entry 300 in specific page lookup table 202), specific page lookup table 202 has no entry with a tag 304 representing virtual address A[130], meaning that there is no translation to a physical address of a specific page from virtual address A[130] in specific page lookup table 202. Consecutive page lookup table 204 has an entry with a tag 404 representing virtual address A[128] that includes 32 page flags 408 for the 32 4 kB pages within the 128 kB region starting at virtual address A[128] (some of the page flags 408 are not shown in FIG. 7). The page flag 408 for virtual addresses A[130] in consecutive page lookup table 204 is set to one, which indicates that the corresponding page is located at a physical address that is 8 kB (i.e., two pages) offset from base physical address Y[0] (i.e., Y[2]). Consecutive region lookup table 206 has an entry with a tag 504 representing virtual addresses A[0]-A[1023] that includes 32 region flags 508 for the 32 128 kB regions within the 4 MB region starting at virtual address A[0] (some of the region flags are not shown in FIG. 7). The region flag 508 for virtual address A[128], which includes A[130], is set to one, which indicates that the pages in a region that is located at a physical address that is 512 kB offset from base physical address X[0] (i.e., X[4], which is address X[0]+512 kB) are contiguous (in that contiguous virtual addresses translate to the respective pages).

Upon receiving a memory access request that indicates virtual address A[130] (e.g., a memory read) from a functional block in processor 102 (e.g., a processor core 108), memory management unit 114 sends a request to TLB 120 for a virtual address to physical address translation for A[130]. Based on the request, controller 208 in TLB 120 performs a lookup for a virtual address to physical address translation in each of specific page lookup table 202, consecutive page lookup table 204, and consecutive region lookup table 206 in parallel (i.e., begins the lookups at substantially the same time). For example, in some embodiments, controller 208 can compute or generate a tag for each of the tables that is used to look up the particular entry in each table (if such an entry is present in the table) that holds the virtual address to physical address translation. The tag may be some or all of the bits from the address A[130], a value computed from the address A[130] alone or with one or more other values (e.g., a hash value, a result of a function, etc., possibly computed using one or more bitmasks, offsets, configuration values, identifiers for the source of the request, operating mode values, etc.), and/or another tag value. The controller 208 can then use a corresponding tag to perform the lookup in each table.

When performing the lookup in consecutive page lookup table 204, in some embodiments, the tag is used to determine the appropriate entry 400 (should such an entry be present in consecutive page lookup table 204) and then another operation is performed to determine which page flag is to be used for the translation. For example, a page flag can be determined using some or all of the bits in the virtual address (as an offset indicating the appropriate page flag, etc.), a value computed from the virtual address and zero or more other values, etc. The same sequence is performed for the consecutive region lookup table 206, with the tag used to determine the appropriate entry 500, and another value used to determine the region flag 508 to be used for the translation.

The lookups return a physical address that equals the base physical address Y[0] plus a two-page offset (i.e., 8 kB) from consecutive page lookup table 204, and a physical address that equals the base physical address X[0] plus a four-region (512 kB) and two-page offset (i.e., 8 kB) from consecutive region lookup table 206. However, because specific page lookup table 202 does not include an entry 300 with a virtual address to physical address translation for address A[130], the lookup in specific page lookup table 202 does not return a physical address. As described above, some embodiments use the physical address returned from the lowest table in the hierarchy of tables 200 as the address for the virtual address to physical address translation. This is true because, in some embodiments, the lower tables indicate "exceptions" to the virtual address to physical address translations in higher tables (e.g., the consecutive region lookup table 206 indicates that all pages in a 128 kB sub-regions in a 4 MB region are contiguous, but consecutive page lookup table 204 includes a 128 kB region-specific entry which counters/replaces the information in consecutive region lookup table 206 with more specific information). In this example, because consecutive page lookup table 204 returned a physical address and specific page lookup table 202 did not, the physical address from consecutive page lookup table 204 is used as the translation for A[130]. The physical address from consecutive page lookup table 204 is then used by memory management unit 114 to perform the memory access for the requesting program.

Figure 8:
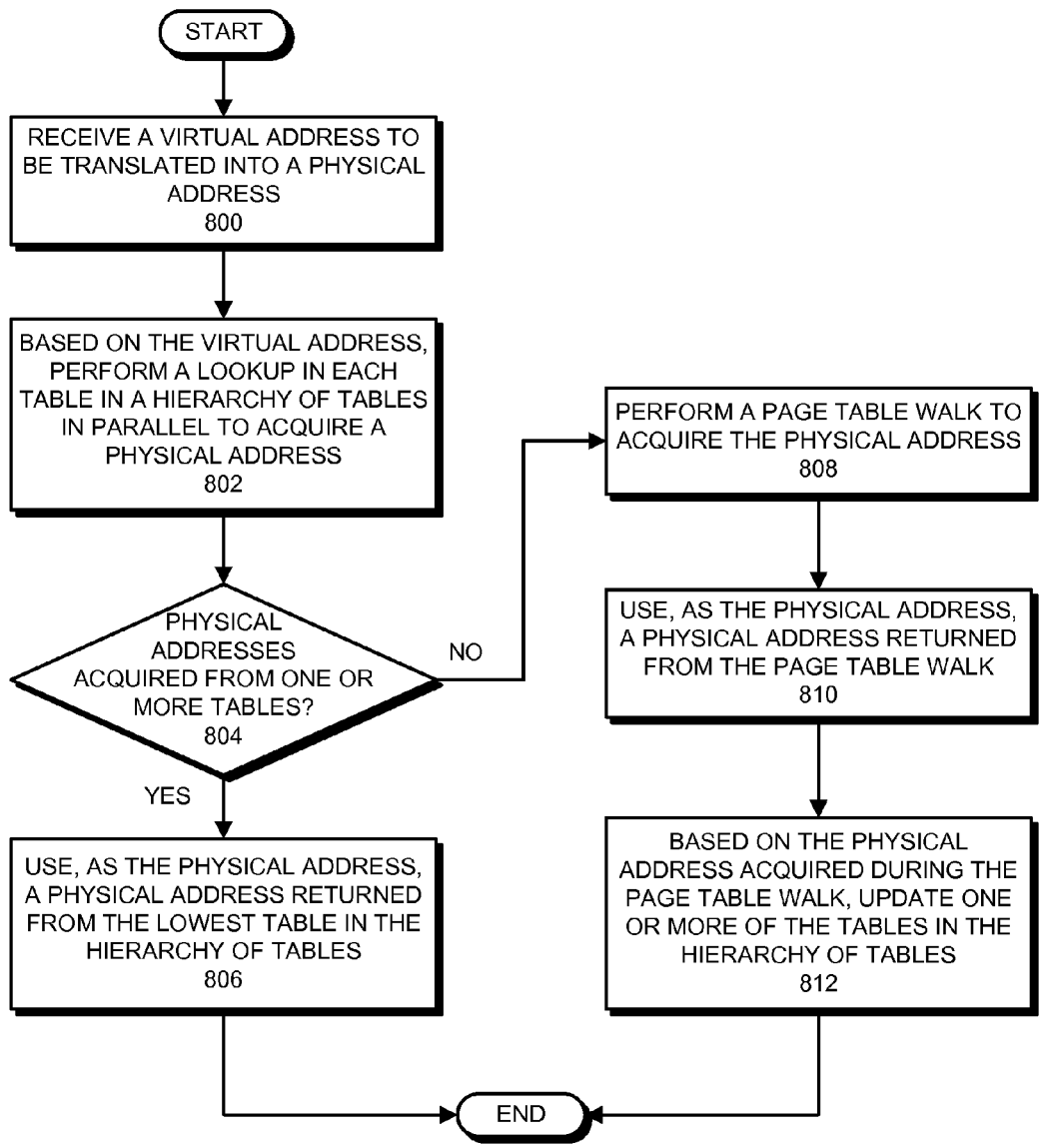
FIG. 8 presents a flowchart illustrating a process for performing a virtual address to physical address translation using a translation lookaside buffer and a page table in accordance with some embodiments.

Performing a Virtual Address to Physical Address Translation Using the Translation Lookaside Buffer FIG. 8 presents a flowchart illustrating a process for performing a virtual address to physical address translation using TLB 120 in accordance with some embodiments. Note that the operations shown in FIG. 8 are presented as a general example of operations performed by some embodiments. The operations performed by other embodiments include different operations and/or operations that are performed in a different order. Additionally, although certain mechanisms are used in describing the operations (e.g., controller 208, specific page lookup table 202, consecutive page lookup table 204, etc.), in some embodiments, other mechanisms may perform the operations. For example, some embodiments have more or less tables in the hierarchy of tables 200.

The process shown in FIG. 8 starts when memory management unit 114 receives a virtual address to be translated into a physical address (step 800). For example, memory management unit 114 can receive a request to perform a memory access such as a memory write that includes the virtual address from a processor core 108 (or another functional block) in processor 102. Memory management unit 114 then acquires (reads, extracts, etc.) the virtual address from the memory access request.

Based on the virtual address, memory management unit 114 causes TLB 120 to perform a lookup in each table in the hierarchy of tables 200 in parallel to acquire a physical address for performing the memory access (step 802). For this operation, TLB 120 may generate tag values for each of specific page lookup table 202, consecutive page lookup table 204, and consecutive region lookup table 206 and may then use the tag values to perform lookups in each of the tables. Performing the lookup includes comparing the tag to tags of one or more entries in each table to determine if an entry in the table includes a virtual address to physical address translation for the received virtual address (the operations performed during the comparison of tags in each table depend on the implementation of the table (content-addressable memory, random access memory, etc.)). Note that performing the lookup operations "in parallel" means starting the lookup operations in each table at substantially the same time.

For consecutive page lookup table 204, the lookup operation includes determining first whether the tag from the virtual address matches a tag 404 for an entry 400 in consecutive page lookup table 204 (and thus an entry 400 that may have a virtual address to physical address translation for the virtual address is present in consecutive page lookup table 204) and then examining page flags 408 for the entry 400 in consecutive page lookup table 204 (assuming one exists) to determine if the translation for the virtual address is actually present in the table (i.e., if the corresponding page flag 408 is set). The same general pattern holds for consecutive region lookup table 206—an entry 500 is found and then a region flag 508 is used to determine if there is a virtual address to physical address translation for the virtual address.

When a physical address is acquired from one or more of the tables (step 804), TLB 120 forwards the physical address from returned from a lowest table in the hierarchy of tables 200 to memory management unit 114, which uses the forwarded address as the physical address (step 806). For example, if a physical address is returned from the specific page lookup table 202 and the consecutive page lookup table 204, the physical address from the specific page lookup table 202 is used as the physical address for the memory access.

However, when a physical address is not acquired from one of the tables (step 804), memory management unit 114 performs a page table walk (in page table 122) to acquire the physical address (step 808). The page table walk comprises checking virtual address to physical address translations in page table 122 until a virtual address to physical address translation is found for the virtual address. (Page table walks are known in the art and hence will not be described in detail.) Memory management unit 114 then uses, as the physical address for the memory access, a physical address returned from the page table walk (step 810).

Next, based on the physical address acquired during the page table walk, memory management unit 114 updates (or causes TLB 120 to update) one or more of the tables in the hierarchy of tables 200 (step 812). The update operation includes determining if the physical address for the page meets a standard for each of the tables so that a corresponding entry can be updated accordingly. In some embodiments, only a highest table in the hierarchy for which the physical address meets the standard is updated. Thus, for consecutive region lookup table 206, memory management unit 114 can determine if the physical address acquired for the virtual address is included in a page that is contiguous with other pages for contiguous virtual addresses in a 128 kB region, and if the pages in the 128 kB region are similarly contiguous, and if the 128 kB region is contiguous with one or more other 128 kb regions in a 4 MB region. If so, memory management unit 114 can set a corresponding regional flag 508 in consecutive region lookup table 206. Otherwise, if the 128 kB region is not contiguous with one or more other 128 kb regions in a 4 MB region, but physical address acquired for the virtual address is included in a page that is contiguous with other pages for contiguous virtual addresses in a 128 kB region, and if the pages in the 128 kB region are similarly contiguous, memory management unit 114 can set a corresponding page flag 408 in consecutive page lookup table 204. Otherwise, memory management unit 114 can update an entry 300 in specific page lookup table 202 with the virtual address to physical address translation.

Series/Sequential Lookups in the Hierarchy of Tables

Although embodiments are described using a parallel lookup operation (e.g., in FIGS. 6-8, etc.), in some embodiments, the lookups can be performed in series/sequentially. For example, in some embodiments, TLB 120 performs a lookup in specific page lookup table 202 first. If the lookup misses in specific page lookup table 202 (and thus specific page lookup table 202 does not hold a virtual address to physical address translation for the virtual address), TLB 120 performs a lookup in consecutive page lookup table 204. If the lookup misses in consecutive page lookup table 204, TLB 120 performs a lookup in consecutive region lookup table 206. When the lookup hits in a given table (and thus a virtual address to physical address translation is found in the table), the series/sequential lookup is halted (and lookups are not performed in any remaining tables) and the physical address acquired from the table is used as the translation. If the lookups miss in all of the tables in the hierarchy of tables, a page table walk is performed such as with the parallel lookups described in FIG. 8 (i.e., steps 808-810).

In some embodiments, a computing device (e.g., computing device 100 in FIG. 1 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A translation lookaside buffer (TLB), comprising:
a consecutive page lookup table configured to store consecutive page records, each consecutive page record comprising a base physical page address and a plurality of page flags that indicate when a corresponding page is located at corresponding offset from the base physical address,
wherein, when a page flag is set to a predetermined value, a corresponding virtual address translates to a physical address that is offset by a corresponding number of pages from the base physical page address.

2. The TLB of claim 1, further comprising:
a specific page lookup table configured to store specific page records, each specific page record comprising a virtual address and a physical address,
wherein the virtual address in each specific page record translates to the corresponding physical address.

3. The TLB of claim 2, further comprising:
a consecutive region lookup table configured to store consecutive region records, each consecutive region record comprising a base physical region address and a plurality of region flags, that indicate whether or not pages located in a corresponding region of memory are contiguous, wherein, when a region flag is set to the predetermined value, a corresponding virtual address translates to a physical address that is offset by a corresponding number of regions and number of pages from the base physical region address.

4. The TLB of claim 2, wherein the specific page lookup table and the consecutive page lookup table are included in a hierarchy of tables, with the specific page lookup table lower in the hierarchy of tables than the consecutive page lookup table, and wherein the TLB further comprises:

a controller configured to:

receive a virtual address to be translated to a physical address;

perform a lookup in the consecutive page lookup table and the specific page lookup table in parallel in an attempt to acquire a physical address to which the virtual address translates from both the consecutive page lookup table and the specific page lookup table; and use, as the translation, the physical address from a lowest table in the hierarchy of tables from which a physical address is acquired.

5. The TLB of claim 4, wherein, when a physical address is not acquired from either the consecutive page lookup table or the specific page lookup table, the controller is further configured to cause a page table walk to be performed to acquire a translation from the virtual address to the physical address.

6. The TLB of claim 2, further comprising:

a controller configured to:

receive a virtual address to be translated to a physical address;

perform a first lookup in the specific page lookup table in an attempt to acquire a physical address to which the virtual address translates;

when the physical address is acquired from the specific page lookup table, use, as the translation, the physical address from the specific page lookup table;

when the physical address is not acquired from the specific page lookup table, perform a second lookup in the consecutive page lookup table in an attempt to acquire a physical address to which the virtual address translates; and when the physical address is acquired from the consecutive page lookup table, use, as the translation, the physical address from the consecutive page lookup table.

7. The TLB of claim 6, wherein, when a physical address is not acquired from either the consecutive page lookup table or the specific page lookup table, the controller is further configured to cause a page table walk to be performed to acquire a translation from the virtual address to the physical address.

8. The TLB of claim 2, further comprising:

a controller configured to:

acquire a translation to a physical address from a virtual address;

for one or more other virtual addresses contiguous with the virtual address from the translation, determine if the physical addresses to which the one or more other virtual addresses translate are contiguous with the physical address from the translation; and if so, set, to the predetermined value, at least one corresponding page flag in a consecutive page record in the consecutive page lookup table;

otherwise, updating a specific page record in the specific page lookup table with the translation to the physical address from the virtual address.

9. The TLB of claim 2, wherein each specific page record and consecutive page record further comprises metadata, the metadata comprising access permissions for a corresponding portion of memory.

10. A method for translating a virtual address to a physical address, comprising:

receiving the virtual address;

performing a lookup in a hierarchy of tables to acquire one or more physical addresses for the virtual address, the hierarchy of tables comprising a specific page lookup table and a consecutive page lookup table; and using, as the physical address, one of the one or more physical addresses returned from the hierarchy of tables.

11. The method of claim 10, wherein the hierarchy of tables further comprises a consecutive region lookup table.

12. The method of claim 10, wherein performing the lookup in the hierarchy of tables to acquire the one or more physical addresses for the virtual address comprises:

performing the lookup in the specific page lookup table and the consecutive page lookup table in parallel.

13. The method of claim 12, wherein the specific page lookup table is lower in the hierarchy of tables than the consecutive page lookup table, and wherein using, as the physical address, one of the one or more physical addresses returned from the hierarchy of tables comprises:

using a physical address from a lowest table in the hierarchy of tables from which a physical address is acquired.

14. The method of claim 10, wherein performing the lookup in the hierarchy of tables to acquire the one or more physical addresses for the virtual address comprises:

performing a first lookup the specific page lookup table; and when the first lookup does not return a physical address for the virtual address, performing a second lookup in the consecutive page lookup table.

15. The method of claim 10, further comprising:

when a physical address is not acquired from either the consecutive page lookup table or the specific page lookup table, performing a page table walk to acquire a translation from the virtual address to the physical address.

16. The method of claim 10, further comprising:

acquiring a translation to a physical address from a virtual address;

for one or more other virtual addresses contiguous with the virtual address from the translation, determining if the physical addresses to which the one or more other virtual addresses translate are contiguous with the physical address from the translation; and if so, update a corresponding consecutive page record in the consecutive page lookup table by setting a corresponding page flag in a consecutive page record;

otherwise, updating a specific page record in the specific page lookup table with the translation to the physical address from the virtual address.

17. A computing device, comprising:

a processor;

a memory; and a translation lookaside buffer (TLB), the TLB comprising:

a consecutive page lookup table configured to store consecutive page records, each consecutive page record comprising a base physical page address and a plurality of page flags, that indicate whether or not pages located in a corresponding offset from the base physical address, wherein, when a page flag is set to a predetermined value, a corresponding virtual address translates to a physical address that is offset by a corresponding number of pages from the base physical page address.

18. The computing device of claim 17, wherein the TLB further comprises:
a specific page lookup table configured to store specific page records, each specific page record comprising a virtual address and a physical address,
wherein the virtual address in each specific page record translates to the corresponding physical address.

19. The computing device of claim 18, wherein the TLB further comprises:
a consecutive region lookup table configured to store consecutive region records, each consecutive region record comprising a base physical region address and a plurality of region flags, that indicated whether or not pages located in a corresponding region of memory are contiguous,
wherein, when a region flag is set to the predetermined value, a corresponding virtual address translates to a physical address that is offset by a corresponding number of regions and number of pages from the base physical region address.

20. The computing device of claim 18, wherein specific page lookup table and the consecutive page lookup table are included in a hierarchy of tables, and wherein the TLB further comprises:
a controller configured to:
receive a virtual address to be translated to a physical address;
perform a lookup in the hierarchy of tables to acquire the physical address to which the virtual address translates from at least one of the consecutive page lookup table and the specific page lookup table; and
when the physical address is acquired from the hierarchy of tables, use, as the translation, the physical address; and
when the physical address is not acquired from the hierarchy of tables, cause a page table walk to be performed to acquire a translation from the virtual address to the physical address.

* * * * *